United States Patent [19]

Ernst et al.

[11] 4,201,282
[45] May 6, 1980

[54] CLUTCH RELEASE ASSEMBLY AND BEARING THEREFOR

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 809,208

[22] Filed: Jun. 23, 1977

[30] Foreign Application Priority Data

Jul. 8, 1976 [DE] Fed. Rep. of Germany ... 7621572[U]

[51] Int. Cl.[2] .................. F16D 19/00; F16C 19/10
[52] U.S. Cl. ...................... 192/98; 192/89 B
[58] Field of Search ............ 192/98, 89 B, 70.27, 192/99 R, 110 B, 99 A, 30 V; 308/233; 74/490

[56] References Cited

U.S. PATENT DOCUMENTS

| 2,630,897 | 3/1953 | Porter | 192/99 A |
| 3,365,040 | 1/1968 | Pitner | 192/98 |
| 4,126,216 | 11/1978 | Babcock et al. | 192/30 V |

FOREIGN PATENT DOCUMENTS

| 2455644 | 5/1976 | Fed. Rep. of Germany | 192/98 |
| 1184415 | 3/1970 | United Kingdom | 192/89 B |
| 1261352 | 1/1972 | United Kingdom | 192/89 B |

Primary Examiner—Benjamin Wyche
Assistant Examiner—David C. Reichard
Attorney, Agent, or Firm—Daniel M. Rosen

[57] ABSTRACT

A clutch release structure includes a clutch release bearing having a running portion, or the like, positioned to axially engage the diaphragm or dish-shaped clutch release elements. The bearing portion, or the like, has an axially extending portion which projects through the central boring in the clutch release elements, and damping means are provided radially between this extension and the clutch release spring elements.

14 Claims, 6 Drawing Figures

CLUTCH RELEASE ASSEMBLY AND BEARING THEREFOR

BACKGROUND OF THE INVENTION

This invention relates to clutch throw-out devices, and is particularly directed to the provision of a clutch throw-out bearing assembly. In particular, the invention is directed to that form of clutch having diaphragm or dished clutch throw-out elements. While the invention is of especial use in the clutches of trucks or the like, it will be, of course, apparent that the invention is not so limited.

Clutch throw-out devices having diaphragm or dished clutch release elements engaging a clutch throw-out bearing are well known. The devices are generally suitable under normal driving conditions. When a vehicle is subjected to large shocks due, for example, to severe jolting on the road, damage may occur to the races of the bearings of the clutch throw-out assembly and the rolling body assembly, and load noises may also be produced.

Clutch throw-out structures are also known in which the diaphragm or dished springs are resiliently set in between the enclosure means. This known arrangement has the disadvantage that severe road jolting results in the striking of the bore surface of the diaphragm or dished spring arrangement by the surfaces of the outer ring of the clutch throw-out bearing. In addition, in this arrangement the self-centering of the clutch bearings is much more difficult to achieve.

In addition, in structures known in the past, closed helical springs have been arranged between the diaphragm spring and the throw-out portions of the clutch, the helical spring being arranged in an annular recess in the end of the diaphragm spring assembly. This arrangement is thereby provided with a number of individual components, and is therefore relatively expensive to produce.

The invention is thereby directed to the provision of a substantially noise-free clutch throw-out structure, wherein a minimum of components are employed, and these components may be assembled in a simple manner and without great expense. The invention is further directed to the provision of such a structure which is adapted to withstand large jolting forces, without damage to the throw-out bearings.

SUMMARY OF THE INVENTION

Briefly stated, in accordance with the invention, the above objectives are achieved by providing a structure wherein a damping member is provided between the diaphragm or dished spring assembly, where the bearing arrangement or an element attached thereto extends through a bore in the diaphragm or dished spring.

According to a further feature of the invention, the outer bearing ring of the clutch throw-out bearing is formed with a Z-shaped cross-section. In this arrangement, the leg of the outer ring away from the rolling body assembly extends through the bore in the diaphragm spring, and has one or more radially outwardly directed ears distributed about the circumference of its free end. These ears serve to hold the damping member in position.

In a further embodiment of the invention, the inner ring of the throw-out bearing may have an extension on the end toward the clutch throw-out springs, the extension passing through a bore of the outer bearing ring and forming a thin sealing space at this end with the other bearing ring.

In a still further embodiment of the invention, the ends of the diaphragm springs of the clutch may have convex curvatures, the outer ring of the throw-out bearing having a Z-shaped cross-section and being arranged with a radially outwardly directed arm thereof advantageously engaging the curve ends of diaphragm springs. In this arrangement, it is preferred that the engaging surface of the outer ring have a convex curvature, in order to assist in the centering of the bearing structure.

BRIEF DESCRIPTION OF THE DRAWINGS

In order that the invention will be more clearly understood, it will now be disclosed in greater detail with reference to the accompanying drawings, wherein.

Figures 1A, 1B:
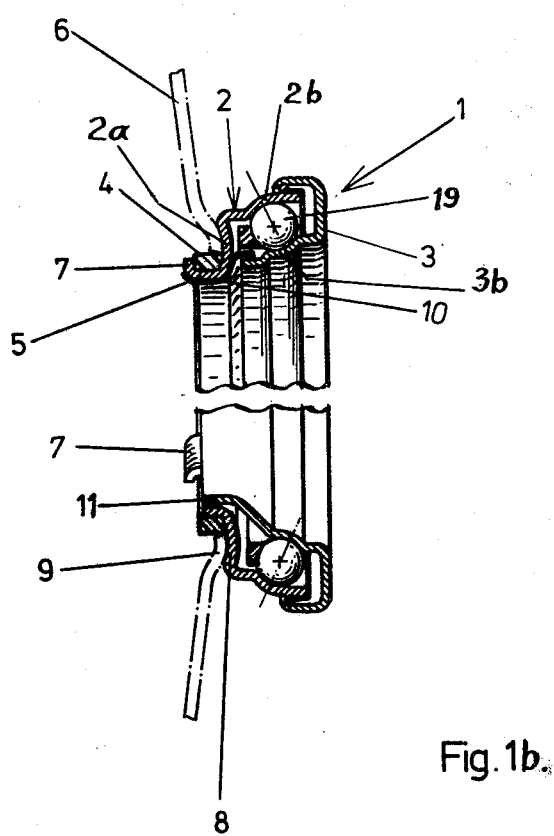
FIG. 1a is a cross-sectional view of one embodiment of the clutch throw-out and bearing assembly in accordance with the invention.
FIG. 1b is a cross-sectional view of a portion of a clutch throw-out and bearing assembly in accordance with another embodiment of the invention.

In the above drawings, it will be apparent that FIGS. 1a and 1b each show the respective embodiment of the invention only to one side of the axis of the respective structure.

DETAILED DESCRIPTION OF THE INVENTION

In accordance with one embodiment of the invention, as illustrated in FIG. 1b, therein is illustrated a cross-sectional view of a portion of a clutch throw-out device 1 having a clutch throw-out bearing with sheet metal bearing rings 2 and 3. The outer bearing ring 2 has a Z-shaped cross-section. The center arm 2a of the outer bearing ring extends radially, and is adapted to axially engage the radially inward ends of the clutch throw-out diaphragm springs 6, which may be shaped as fingers. One of the outer arms 2b of the outer ring is formed as a race, and a portion 3b of the inner bearing ring 3 is also formed as a race, whereby rolling elements, such as the balls 19, are distributed between the races. A suitable cage is, of course, provided for the balls.

The other end or arm 5 of the outer ring extends through the bore formed by the radially inward ends of the throw-out spring 6. The free end of the arm 5 of the outer ring 2 is provided with radially outwardly projecting ears 7 or the like distributed about its circumference. A damping ring 4 is provided on the outer radial surface of the arm 5 of the outer ring extending to the spring 6, and this arm 5, the ears 7, and the central portion 2a of the outer ring form an annular recess for receiving the damping ring 4. The damping ring 4 may be of rubber or a plastic material. The damping ring 4 is thereby radially aligned with the radially inner ends of the diaphragm spring 6.

As illustrated in FIG. 1a the ends of the diaphragm spring 6 toward the bearing are concave, and the central portion 2a of the outer bearing ring is concave, in order to enable the centering of the bearing in accordance with the known technique. The damping ring 4 has an elasticity selected such that this centering of the bearing may still be effected, even though the ends of the diaphragm spring may contact the damping ring material.

In the embodiment of the invention illustrated in FIG. 1a the space between the inner and outer rings is sealed by a Z-shaped sheet metal element 10. This sealing arrangement is modified in the arrangement of the invention illustrated in FIG. 1b, wherein an extension 11 from the end of the inner bearing ring 3 toward the clutch extends through the bore of the outer ring, and forms a thin sealing gap with the outer bearing ring.

Aside from the above discussed elements, the bearing and clutch throw-out structure in accordance with the invention is designed in accordance with conventional practice and of conventional materials.

Figure 2:
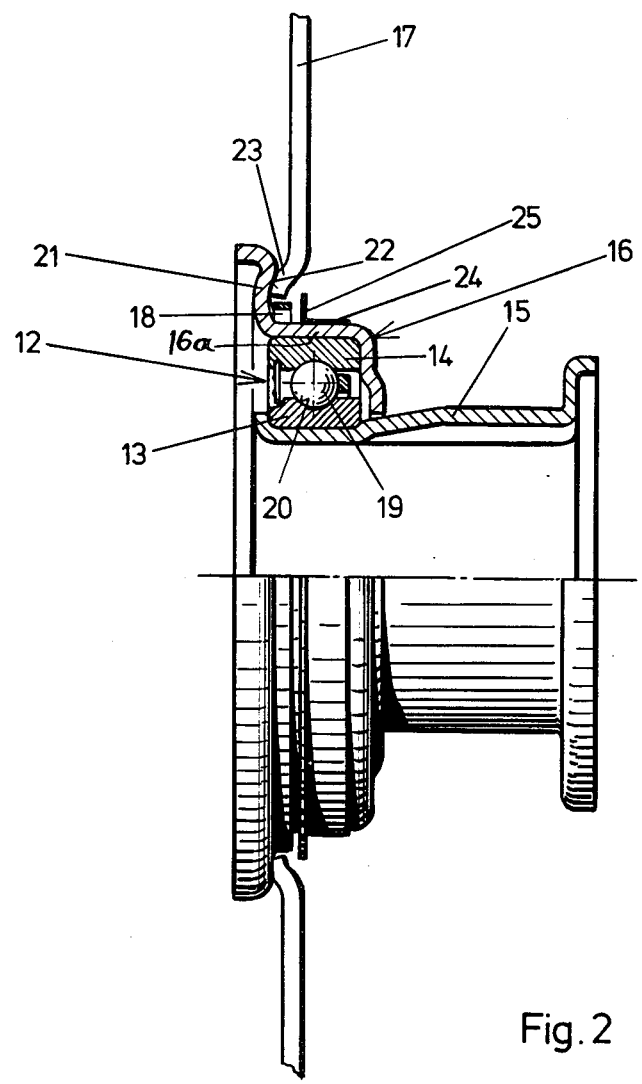
FIG. 2 is a partial cross-sectional view of a clutch throw-out and bearing assembly in accordance with a still further embodiment of the invention.

In the embodiment of the invention illustrated in FIG. 2, the throw-out bearing 12 has solid bearing rings 13 and 14 forming races therebetween in which the ball 19 or other rolling elements are arranged. A conventional cage is also provided in this arrangement. The inner bearing ring 13 extends over and is held to a housing 15, the inner bearing ring being, for example, held in an annular recess in the housing 15. This connection may be a press fit connection. The outer bearing ring is press fit in a casing 16, which may have a Z-shaped cross-section. Thus, the outer bearing ring 14 may be press fit in the axially extending center portion 16a of this casing.

A spring ring 18 is provided surrounding the center portion 16a of the casing 16, the spring ring 18 being aligned radially within the hole defined by the radially inner end of the diaphragm spring 17. The radially outwardly extending leg 21 of the casing 16 axially engages the radially inner end 23 of the diaphragm spring 17.

Figure 3:
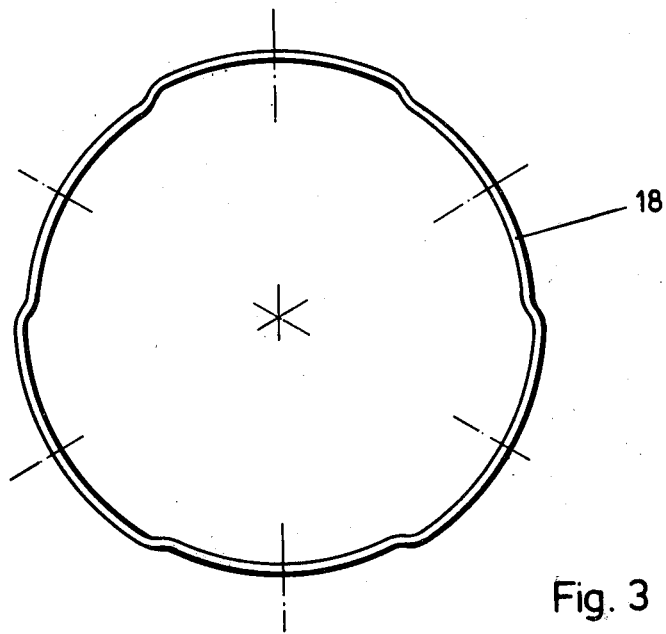
FIG. 3 is a side view of an annular spring that may be employed in the arrangement of FIG. 2.

A side view of the ring-shaped spring 18 is illustrated in FIG. 3. As in the arrangements of FIGS. 1a and 1b, the leg 21 of the casing 16 may be concave, and the sides of the diaphragm spring 17 directed theretoward may be convex, in order to aid in the automatic centering of the bearing assembly during use. The terms "concave" and "convex" in this sense refer to the fact that the respective surfaces have centers of curvature defined by annular loci, and not by the axis of the bearing structure itself.

Referring still to FIG. 2, an annular element 24 having an angle shaped cross-section is fixed to the outer surface of the center portion 16a of the casing, whereby the radially outwardly extending leg 25 of this element defines, with the leg 21 and a portion of the center portion 16a of the casing 16, an annular recess for retaining the spring 18 in position. In addition, the leg 25 of the element 24 may serve to retain the relative position between the clutch throw-out spring 17 and the bearing assembly.

As in the arrangement of FIGS. 1a and 1b, the resilient element 18 of FIG. 2 serves to avoid damage to the structure in the event of strong roadway jolting, so that the ball bearing assembly including the balls 19, the bearing rings 13 and 14, etc., are not damaged. The resilient elements of these embodiments of the invention at the same time permit a relative movement between the diaphragm spring 17 and the casing 16, so that a degree of free movement of the bearing 12 is possible.

Still further, in view of the use of the damping element such as the ring 18 of FIG. 2 and the damping 4 of FIGS. 1a and 1b, noise produced in the operation of the structure is minimized.

Figures 4, 5:
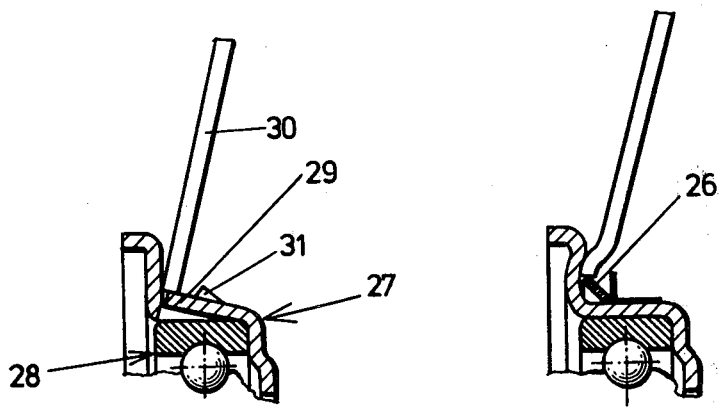
FIG. 4 is a cross-sectional view of a portion of a modification of the assembly of FIG. 2.
FIG. 5 is a cross-sectional view of a portion of a still further embodiment of a clutch throw-out and bearing assembly in accordance with the invention.

In the modification of the invention, illustrated in FIG. 4, the ring 18 of FIG. 3 is replaced by a spring ring 26 which has a dished shape, that is, the material of the ring does not extend directly in the axial direction. Otherwise, this embodiment of the invention is the same as that illustrated in FIG. 3.

In the still further embodiment of the invention as illustrated in FIG. 5, the casing 27 for receiving the outer bearing ring of the bearing 28, also has a Z-shaped cross-section as in the structure of FIG. 3. In the arrangement of FIG. 5, however, the center axially extending portion of this casing 27 is provided with outwardly extending spring fingers 29, the fingers 29 radially engaging the inner ends of the diaphragm spring 30 of the clutch throw-out device. In addition, projections 31, which also extend radially outwardly, are provided on the center portion of the casing 27, but circumferentially spaced from the spring finger 29. The projections 31 serve to axially hold the clutch bearing assembly to the diaphragm spring 30. As illustrated, the projections 21 may be axially spaced from the ends of the diaphragm spring 30 when the structure is in use.

The spring ring illustrated in FIG. 3, for use in the embodiment of the invention of FIG. 2, preferably has circumferentially spaced portions distributed about its periphery and is adapted to alternately engage the casing, and the radially inner ends of the membrane spring.

While the invention has been disclosed and described with reference to a limited number of embodiments, it will be apparent that variations may be made therein. For example, small radial play may be provided between the damping member and the diaphragm spring of the clutch, in order to readily enable radial adjustability of the throw-out bearing and to insure a greater radial displacement, for damping very strong roadway jolting forces on the clutch assembly. It is intended in the following claims to cover each such variation and modification as falls within the true spirit and scope of the invention.

What is claimed is:

1. In a clutch throw-out device having a clutch bearing with first and running bearing ring means defining bearing races, at least a portion of said races being radially spaced apart, and rolling elements positioned in said races between said ring means and inhibiting relative radial displacement therebetween, diaphragm or dished clutch release spring means axially engaging said running bearing ring means, whereby radial play may exist between said clutch release spring means and said running bearing ring means, said running bearing ring means having an axially extending portion extending through a central bore in said clutch release spring means; the improvement comprising a damping member mounted radially between said axially extending portion of said running bearing ring means and said clutch release spring means.

2. The clutch throw-out device of claim 1, wherein said damping member comprises annular resilient means surrounding said axially extending portion of said running bearing ring means.

3. The clutch throw-out device of claim 1, wherein said running bearing ring means comprises an annular outer bearing ring of said clutch bearing and has a Z-shaped cross-section, an arm of said outer ring means extending through the bore of said clutch release spring means, and outwardly radially directed ears on the free ends of said arm of said outer ring means, to define a space for said damping member.

4. The clutch throw-out device of claim 1, wherein said first and running bearing ring means comprise inner and outer bearing rings respectively of said clutch bearing, one end of said inner ring means extending axially within said axially extending portion of said outer bearing ring means to define a sealing space between said inner and outer rings at the end of said clutch bearing away from said rolling elements.

5. The clutch throw-out device of claim 1, wherein said running bearing ring means has a Z-shaped cross-section with an axially extending center portion for receiving a bearing ring held in said center portion, and a radially outwardly extending flange positioned to axially engage said clutch release spring means.

6. The clutch throw-out device of claim 5, wherein said flange has a concave cross-section.

7. The clutch throw-out device of claim 1, wherein said damping member is of a plastic material.

8. The clutch throw-out device of claim 1, wherein said damping member is of rubber.

9. The clutch throw-out device of claim 1, wherein said damping member comprises a spring ring.

10. The clutch throw-out device of claim 9, wherein said ring spring is of a resilient metal material.

11. The clutch throw-out device of claim 1, wherein said running bearing ring means comprises an annular member having radially outwardly extending resilient fingers radially engaging the radial inner ends of said clutch release spring means, said fingers defining said damping member.

12. The clutch throw-out device of claim 11, wherein said running bearing means has a radially extending flange positioned to axially engage one side of said clutch release spring means, and radially outwardly extending projections positioned adjacent the other side of said clutch release spring means to axially retain said clutch release spring means with respect to said casing.

13. The clutch throw-out device of claim 1, wherein said damping member radially engages said clutch release spring means.

14. The clutch throw-out device of claim 1, wherein said damping member is radially spaced inwardly of said clutch release spring means.

* * * * *

UNITED STATES PATENT AND TRADEMARK OFFICE
CERTIFICATE OF CORRECTION

PATENT NO. : 4,201,282
DATED : May 6, 1980
INVENTOR(S) : H.M.Ernst, et al

It is certified that error appears in the above-identified patent and that said Letters Patent are hereby corrected as shown below:

Column 5, line 18-19, "for receiving" should read -- , --.

Signed and Sealed this

Seventh Day of October 1980

[SEAL]

Attest:

SIDNEY A. DIAMOND

Attesting Officer     Commissioner of Patents and Trademarks